United States Patent [19]

Haskell et al.

[11] 4,125,314

[45] Nov. 14, 1978

[54] BEAM RATIO CONTROL FOR HOLOGRAPHY

[75] Inventors: Richard E. Haskell; Ralph M. Grant, both of Rochester, Mich.

[73] Assignee: Dr. Ralph M. Grant Engineering Consultants, Inc., Auburn Heights, Mich.

[21] Appl. No.: 794,059

[22] Filed: May 5, 1977

[51] Int. Cl.² .............................................. G03H 1/02
[52] U.S. Cl. .................................. 350/3.60; 350/266; 356/222
[58] Field of Search .................. 350/3.5, 266, 3.60, 350/3.81; 356/89

[56] References Cited

U.S. PATENT DOCUMENTS

| | | | |
|---|---|---|---|
| 2,439,373 | 4/1948 | Stearns | 356/89 |
| 3,437,411 | 4/1969 | Rudomanski et al. | 356/89 |
| 3,598,467 | 8/1971 | Pearson | 350/3.5 |
| 3,729,634 | 4/1973 | Jensen et al. | 350/3.5 |
| 3,738,756 | 6/1973 | Chaney | 356/117 |
| 3,755,677 | 8/1973 | Ooue et al. | 350/3.5 |
| 3,758,786 | 9/1973 | Weinel | 350/266 |
| 3,922,060 | 11/1975 | Oosaka et al. | 350/3.5 |

*Primary Examiner*—Ronald J. Stern
*Attorney, Agent, or Firm*—Krass & Young

[57] ABSTRACT

To form a hologram of a section of an object surface one end of each of a pair of elongated, flexible, optical fibers is illuminated with a laser beam through an optical mechanism which allows adjustment of the amount of light that falls on each of the fiber ends. The opposite end of one of the fibers is disposed adjacent to the object of which the hologram is to be formed so that the light output of that fiber diffuses and illuminates the relevant surface. A photographic plate is disposed to receive light reflected from the object surface as well as a reference beam radiating from the output end of the other fiber. A photodetector device receives a portion of the reference beam at one input and a portion of the object beam at another input and provides a visual indication of the relative intensity of the beams. The input to the fiber elements is adjusted to achieve the desired beam ratio for forming a hologram.

5 Claims, 5 Drawing Figures

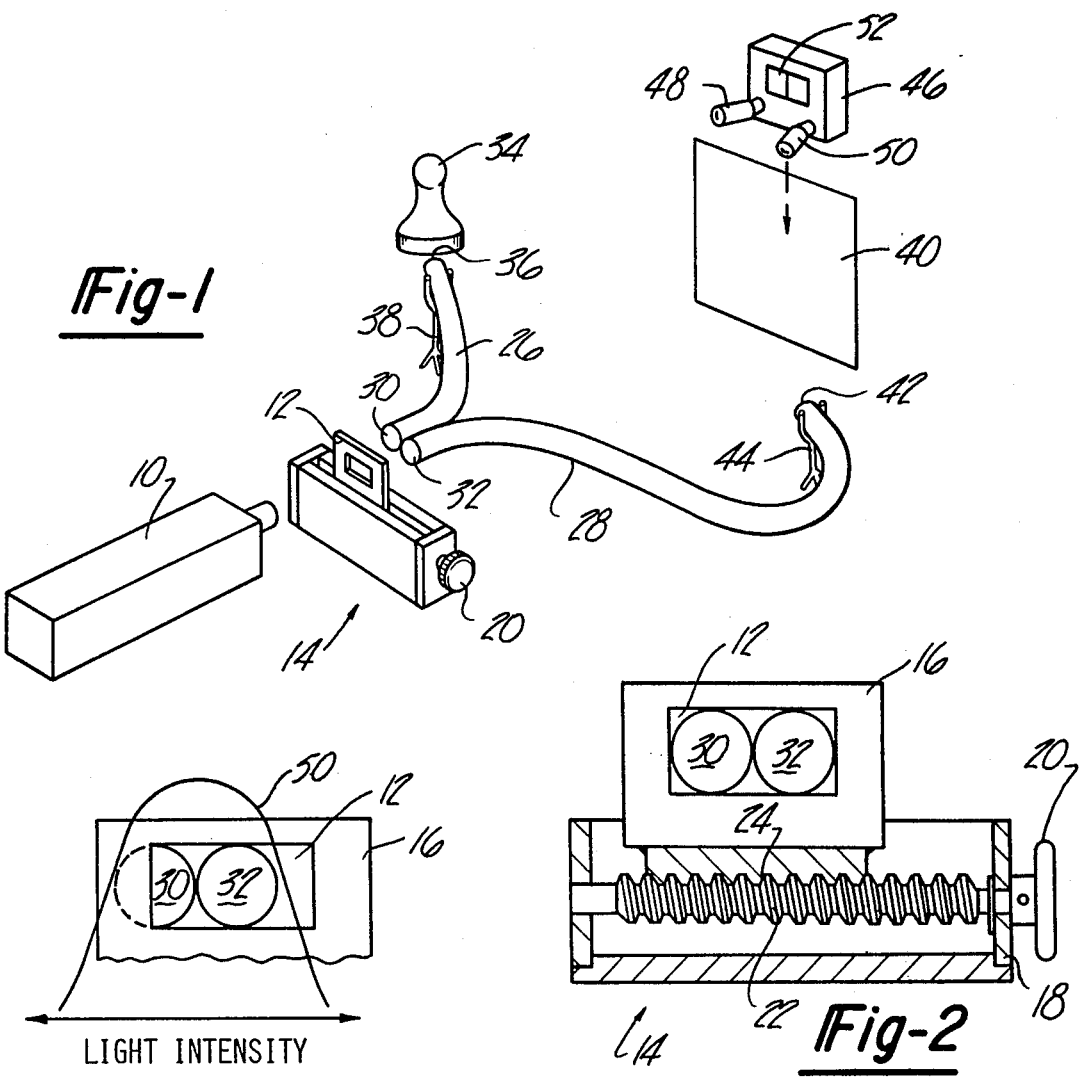
*Fig-1*
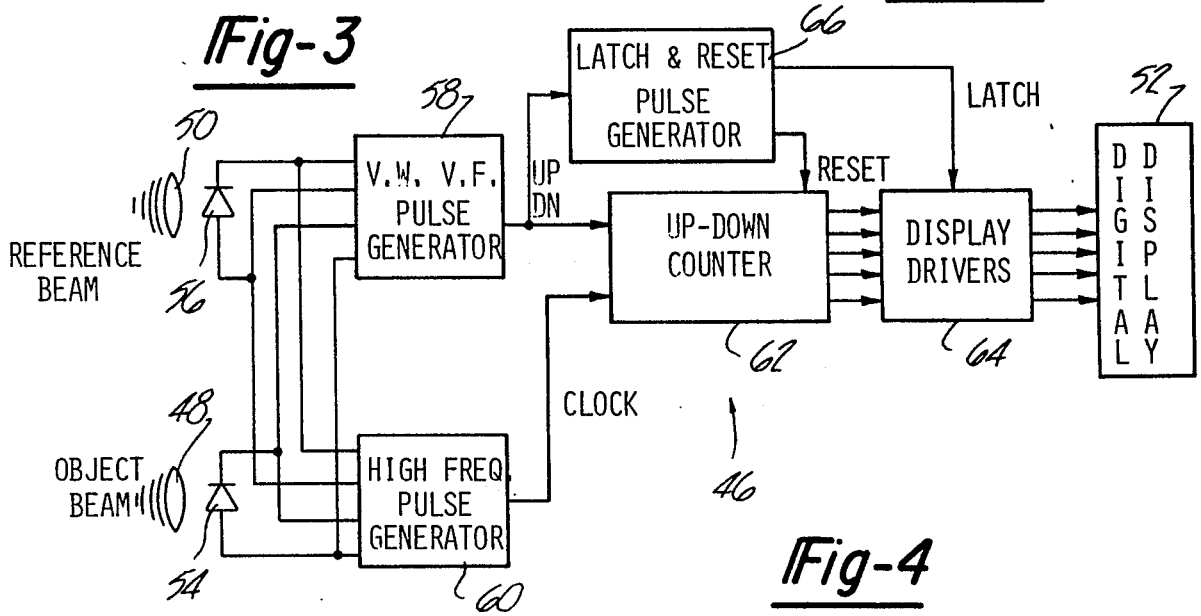
*Fig-2*
*Fig-3*
*Fig-4*

BEAM RATIO CONTROL FOR HOLOGRAPHY

BACKGROUND OF THE INVENTION

1. Field of the Invention

This invention relates to a method of forming holograms which allows simple and precise adjustment of the relative intensities of the object and reference beams and to apparatus for practicing that method including an electronic device for providing an indication of the relative beam intensity at the photographic media and fiber optic means for conducting light from a coherent light source to the object and photographic media and for adjusting the relative intensities of these two light paths.

2. Prior Art

In the formation of a hologram a photographic media receives an object beam of light reflected from an object surface which is illuminated with a temporarily and spatially coherent source as well as a reference beam of light directly from the source. The media records the interference patterns between these two coherent light systems. This interference pattern encodes information about the three-dimensional nature of the illuminated object surface and upon development of the photographic media and illumination with an appropriate light source, a three-dimensional image of the object surface may be reconstructed.

The quality of the reconstructed image depends, among other things, on the relative intensities of the object and reference beams reaching the photographic media during the formation of the hologram and the relative length of the light paths from the laser to the photographic media for both the reference beam and the object beam. Generally, the path lengths should be as close to equal as possible and the reference beam should have about two to three times the intensity of the object beam at the photographic media to form a good hologram, but this latter ratio may vary as a function of the object surface and the particular photographic emulsion that is employed.

In conventional holographic set-ups it is often difficult to achieve the ideal ratio of reference beam to object beam intensity, preserve the optimum ratio of reference and object beam path lengths and simultaneously achieve a geometry which properly illuminates the surface of the object on which a hologram is being formed. In conventional apparatus the laser beam is divided into object and reference beams by a beam splitter which usually takes the form of a partially silvered mirror. The beam intensity ratio is often adjusted by shifting a beam splitter whose reflectance is variable in order to modify the percentage of light diverted into the two beams. Diffusers formed of coated glass or the like are often placed in the light beam that illuminates the object to minimize specular reflection to the plate.

SUMMARY OF THE INVENTION

The present invention relates to a method of forming holograms and apparatus for practicing the method which greatly simplifies the optical set-up, and increases the precision of the beam adjustment ratio and the path line ratio to produce holograms of improved quality. The present invention is particularly applicable to machines for practicing double exposure holographic interferometry for purposes of produce inspection. The simplicity of set-up increases the speed of the apparatus so it may be economically used for inspection of units produced in large quantities.

The present invention broadly employs optical fibers to convey the object beam and/or the reference beam from the laser, or other source of coherent light, to the object surface to be illuminated and/or the photographic media respectively.

The optical fibers may be bent to by-pass other optical elements or to clear sections of the object without affecting either the path length, which is determined by the length of the fibers, or the relative intensity of the object and reference beams at the photographic plate. This makes it very simple to set up the holographic apparatus and to modify it to form holograms of successive objects and to remove objects and replace them with others. The light output from the fiber elements is inherently diffused, eliminating the need for separate diffuser plates as employed in the prior art.

The input ends of the two fiber optic elements or bundles are fixed relative to one another and are illuminated by a single coherent light beam, preferably derived from a laser. An optical mechanism is provided for adjusting the position of the laser beam relative to each of the fiber ends so that the area of one fiber end which is illuminated by the beam may be increased while the same motion decreases the area of the other fiber that is illuminated to vary the relative intensities of the object and reference beams. This mechanism eliminates the need for the inefficient beam splitters used in the prior art to divide the laser beam into two parts and to control their relative intensity and accordingly better conserves light power.

In order to measure the relative intensities of the reference and object beams at the photographic plate the present invention contemplates an electronic device employing photodetectors to sense the two beams and provide a digital display representative of the beam ratio. In a preferred embodiment of the invention, which will subsequently be disclosed in detail, the ratio detector employs an astable multi-vibrator having high and low periods determined by the intensity of the two detected beams. The multi-vibrator output is fed to a counter along with a square wave having a period which is a function of the sum of the two beam intensities. The counter counts up during the high period of the asymmetrical wave and counts down during the low period. The net count as displayed represents the required beam ratio.

To form a hologram of an object surface a pair of optical fibers are chosen which have a length difference approximately equal to the distance from the object surface to a photographic plate. The output end of the shorter fiber is placed adjacent to the object surface and the output end of the longer fiber is used to illuminate the photographic plate. The relative intensities of the reference beam and the object beam as reflected from the object surface are measured at the photographic plate and the position of the laser beam relative to the input ends of the fibers is adjusted to obtain the desired ratio. The detectors of the beam ratio meter are preferably sensitive to the particular wavelength of the laser output and relatively insensitive to other visual wavelengths allowing the set-up to be performed in normal light. Set-up of the apparatus of the present invention is substantially easier to perform than the intricate set-up required with the prior art and may be performed by relatively unskilled personnel with a higher degree of accuracy than was previously obtained.

Other objectives, advantages and application of the present invention will be made apparent by the following detailed description of a preferred embodiment. The description makes reference to the accompanying drawings in which:

FIG. 1 is a perspective view of apparatus formed in accordance with the present invention for forming a hologram of an object;

FIG. 2 is a perspective view of a preferred embodiment of the device for adjusting relative intensities of the laser beams falling on the input ends of the two fibers;

FIG. 3 is a diagram illustrating the operation of the intensity ratio adjustment mechanism of FIG. 2;

FIG. 4 is a block diagram of the beam ratio meter; and

Figure 5:
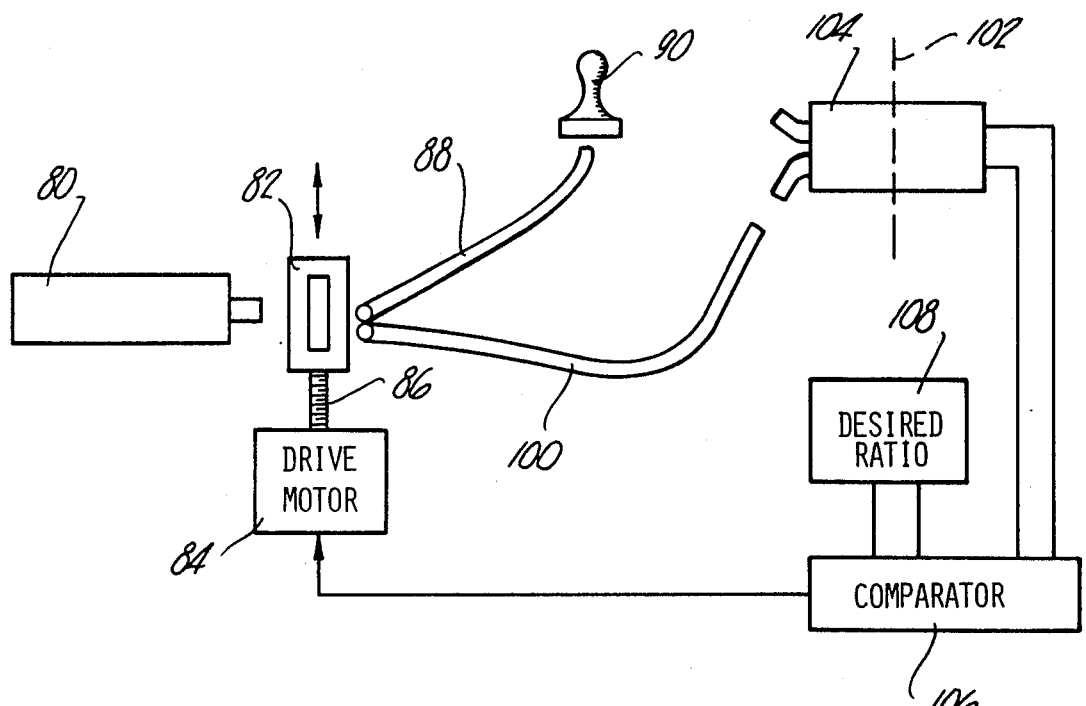
FIG. 5 is a block diagram of an alternative form of the invention employing automatic control of the beam ratio.

The apparatus for forming holograms illustrated in FIG. 1 requires a source of spatially and temporally coherent light, preferably taking the form of a laser 10. The power output of the laser and its wavelength may be chosen in accordance with well-known practice.

The output beam of the laser 10 is directed at a slot 12 formed in an adjustable aperture device generally indicated at 14. The device, illustrated in detail in FIG. 2, employs a plate 16 aligned normally to the direction of the laser beam, having a central rectangular aperture 12 which forms the slot. The plate 16 is supported on a slide mount 18 for motion in the direction parallel to the principal axis of the slot 12. This motion results from manual rotation of an adjustment knob 20 connected to a spiral screw 22 which meshes with rack-like teeth 24 formed on the bottom edge of the plate 12. By rotating the knob 20 in the proper direction the plate 16 may be moved in either direction along the plate 16 thus adjusting the horizontal position of the aperture 12 relative to the laser beam.

The normally cut ends 30 and 32 of a pair of high quality optically conductive fibers 26 and 28 are secured together so that they lie in the same plane, immediately adjacent to one another. These ends 30 and 32 are supported on the opposite side of the aperture 12 from the laser.

The width of the aperture 12 is preferably slightly shorter than the combined diameters of the tube fibers 26 and 28 so that when the aperture 12 is centered with respect to the fibers its side edges block small sections on the opposed edges of both of the fibers. When the aperture is moved in one direction or the other from the center position by rotation of the knob 20 one of the fiber ends is covered to a larger degree and the other fiber end is exposed to a greater degree. Rotation in the opposite direction reverses this process. The laser beam is preferably large enough to extend over the entire width of the two fibers. It may be necessary to achieve some enlargement of the beam with appropriate optics, depending on the natural beam width of the laser employed and the size of the optical fibers.

This arrangement allows the ratio of the quantities of light, or the illumination intensities that the two fibers receive from the laser to be adjusted. This adjustment is used to control the ratio of the reference to object beam in the recording of a hologram as will be subsequently disclosed.

The fiber 26 is arrayed so that its end opposite to the end 30 is positioned near an object 34 of which a hologram is to be formed. The object 34 is illustrated as a chess man, a common object for experimental holography, but may be any object or scene of which a hologram is to be formed for display purposes, recording purposes, for the performance of holographic interferometry, or any of the other purposes for which holography may be employed. The end 36 of the fiber 26 which is supported adjacent to the object 34 is preferably retained in some form of stand 38. The end 36, like the other ends of both optical fibers, is preferably polished. The light emanating from this end as a result of the illumination of the opposite end 30 by the laser beam is diffused by virtue of the multiple internal reflections within the fiber and the refraction at both ends and accordingly no diffuser is required to produce the desirable diffuse illumination of the object.

The flexible nature of the fiber 26 allows the disposition of the end 36 to be readily adjusted to control the illumination of the object 34 without any modification of the optical set-up. This is to be contrasted to the process of holography using conventional optical components wherein adjustment of one element typically requires the adjustment of all other elements in the set-up.

A photographic plate 40 is positioned with respect to the illuminated surface of the object 34 to receive illumination reflected from the surface which acts as an object beam. The photographic plate may be of any conventional type employed with holography.

The photographic plate 40 is also illuminated with a reference beam emanating from the end 42 of the fiber 28, opposite to the light receiving end 32. The fiber end 42 is preferably supported on a stand 44 and its disposition may be readily adjusted to provide diffuse and uniform illumination of the photographic plate 40.

To maintain a substantial equality between the paths of the reference and object beams from the laser to the photographic plate, the reference beam fiber 28 is somewhat longer than the object beam fiber 26, with the difference in length being related to the distance of the object 34 from the photographic plate 40. The excess length of the fiber 28 may be arrayed in any desired manner, to clear other elements, etc.

In order to adjust the ratio of the intensities of reference and object beams at the photographic plate, a beam ratio meter 46 is employed. The meter is shown slightly out of position in FIG. 1 for purposes of illustration. It employs a pair of lenses 48 and 50, directed generally at the object and at the reference beam end 42 of the fiber 28. The lenses may employ pivotable mounts. The meter has a two digit display 52 and the meter 46 incorporates photo sensors for detecting the intensity of the reference and object beams and for generating a number on the display representative of their ratio. In the preferred embodiment of the invention this number may vary from 0 to 99. Zero represents an infinitely high ratio of reference beam to object beam and 99 represents an infinitely high ratio of object beam to reference beam. At the number 33 the beam intensities are about equal. The details of the structure of the beam ratio meter will be subsequently described in connection with FIGS. 4 and 5.

When the apparatus is being set up the beam ratio meter 46 is placed in front of the photographic plate 40 and the knob 20 of the aperture control device 14 is rotated to modify the relative proportions of the beams falling on the two fiber ends 30 and 32 to achieve a desired beam ratio.

FIG. 3 illustrates the geometry of the normal intensity distribution of the light beam 50 produced by the laser, the fiber ens 30 and 32 and the aperture 12. Adjustment of the aperture over the fiber ends causes the relative intensity of the beam reaching the two fibers to be varied. The photographic plate 40 is either removed from its support or covered while the beam ratio is being adjusted. After the ratios have been adjusted the laser 10 is extinguished and the plate is replaced or uncovered and the meter 46 is removed. A holographic exposure may then be made by energizing the laser 10 so that the object and reference beams reach the photographic plate 40 and their interference pattern is recorded on the plate.

While the preferred embodiment of the invention employs a pair of fibers for conducting both the object and reference beams, it should be recognized that in alternative embodiments of the invention only a single fiber may be employed to conduct one of these beams and the other beam could be conducted in a conventional manner. In that situation a more conventional beam splitter would be required to adjust the beam intensity ratio. The beam ratio meter 46 could also be used with apparatus in which one or both of the beams is arrayed in a more normal manner, without the use of optical fibers.

The block diagram of the circuitry of the beam intensity meter 46 is illustrated in FIG. 4. A semi-conductor photodetector 54 is supported behind the lens 48 to receive the collected object beam while a second semi-conductor photodetector 56 is supported behind the lens 50 to receive the collected reference beam. The outputs of both of the photodetectors 54 and 56 are provided to a variable width, variable frequency pulse generator 58. This is preferably implemented as part of a 556 integrated circuit dual timer available from several semi-conductor manufacturers. The pulse generator constitutes an astable multi-vibrator providing a rectangular output wave having a high time that is a function of the outputs of both of the photodetectors and a low time that is a function only of the output of the detector 56 of the reference beam. The outputs of both photodetectors are also provided to a high frequency pulse generator 60 which constitutes an astable multi-vibrator. The generator 60 has a square wave output with a period which is a function of both of the beam but which occurs at a substantially higher rate than the outputs from the pulse generator 58. The outputs of the high frequency pulse generator 60 provide clocking inputs to an up-down counter 62, while the direction of count of the counter is controlled by the outputs of the lower frequency pulse generator 58. The counter counts up while the output of pulse generator 58 is high and counts down while it is low. If the counter starts from zero at the beginning of an output cycle from the variable pulse width generator 58, at the end of a full wave output it will contain a net count proportional to the difference between the up and down times of the output of pulse generator 58, and thus proportional to the ratio between the intensities of the object and reference beam. The output of the counter 62 is provided to a latching display driver 64 and the digital display 52 represents the output state of the drivers.

The output of the pulse generator 58 is also provided to a latch and reset pulse generator 66. When the output of the generator 58 goes high, the generator 66 provides a short pulse to the display drivers which causes them to latch at the state of the counter 62 at that time. The generator 66 then provides a short pulse to the counter 62 which resets its count to zero. The up-down counter then counts the output pulses from the generator 60 in the up direction while the output of the pulse generator 58 is high and then counts down when the output goes low. When the output of the pulse generator again goes high the latch signal from the generator 66 causes the net count of the counter 62 to be locked into the display driver 64 so it will be displayed during the next period, and the counter 62 is reset to zero. The digital display 52 is thus adjusted at a regular rate and represents the ratio of the beam intensities.

An alternative embodiment of the invention is illustrated in FIG. 5 wherein the aperture is automatically adjusted as a function of the difference between a desired object/reference beam intensity ratio and the actual ratio as measured by a meter.

Broadly, the laser 80 provides a coherent light beam to an aperture 82 controlled for reciprocating motion by a drive motor 84 operating through a screw 86. A relatively short optical fiber 88 having one end supported on the opposite side of the aperture 82 illuminates an object 90. A second optical fiber 100 illuminates a photographic plate 102 shown in phantom. A beam intensity ratio meter 104 is supported adjacent to the photographic media 102 and provides an electrical output signal representative of the beam ratio to a comparator circuit 106. The comparator also receives a signal from unit 108 which stores the desired beam ratio. This desired ratio may be entered into the unit 108 with thumbwheels or the like.

Comparator 106 provides an output signal representative of the difference between the desired ratio and the actual ratio to the drive motor 84. The motor moves the aperture in such a direction as to attain the desired ratio.

The embodiments of the invention in which an exclusive property or privilege is claimed are defined as follows:

1. An apparatus for forming a hologram of an object on a photographic media, including a source of coherent light, a first object optical beam path from said source to said object, and a second reference beam optical path from said source to said media, the improvement comprising: a first elongated bundle of optically conductive fibers having one end supported adjacent the coherent light source and arrayed so as to form one of said optical paths; a second distinct elongated bundle of optically conductive fibers having a first end adjacent to and coplanar with the end of the first optical fiber bundle which is adjacent the light source and having a second end arrayed so that the second fiber bundle forms the other of the optical paths; an adjustable aperture mask supported between the coherent light source and the first ends of said first and second fiber bundles; and means for adjusting said aperture to modify the ratio of light quantities that fall on the ends of the first and second optically conductive fiber bundles.

2. The apparatus of claim 1 wherein said aperture mask is adjustable transversely of the axes of said optical fiber bundles adjacent their first ends.

3. The apparatus of claim 2 including means for measuring the ratio of the illumination of the photographic media from the coherent source and the illumination of the photographic media from light reflected from the object.

4. The apparatus of claim 3 including means controlled by said means for sensing the ratio of the illumination for controlling the position of the aperture mask.

5. The apparatus of claim 4 in which said means for measuring the ratio of intensities of the two light beams at the photographic media employs: a pair of photodetectors; a variable pulse width generator controlled by the outputs of said photodetectors; a reversible counter having its count direction controlled by the output of the generator; and display means for displaying the net count in the counter at the end of the generator cycle.

* * * * *